G. E. NEWELL.
SHOCK ABSORBER.
APPLICATION FILED NOV. 19, 1912.

1,067,130.

Patented July 8, 1913.

Witnesses
C. C. Kemper
P. M. Smith

Inventor
G. E. Newell,
By Victor J. Evans
Attorney

UNITED STATES PATENT OFFICE

GREENE E. NEWELL, OF HOUSTON, TEXAS.

SHOCK-ABSORBER.

1,067,130. Specification of Letters Patent. Patented July 8, 1913.

Application filed November 19, 1912. Serial No. 732,313.

*To all whom it may concern:*

Be it known that I, GREENE E. NEWELL, a citizen of the United States, residing at Houston, in the county of Harris and State of Texas, have invented new and useful Improvements in Shock-Absorbers, of which the following is a specification.

This invention relates to shock absorbers for use upon automobiles and other vehicles, in which springs are employed between the axle and the body of the vehicle, the object in view being to provide a device of the class referred to adapted for use in conjunction with the ordinary springs to prevent excessive operation of the springs, both in the downward and upward thrust of the body of the machine, also avoiding to a large extent the liability of the springs being fractured by sudden impacts met with on rough roads.

With the above and other objects in view, the invention consists in the construction, combination and arrangement of parts, as will be hereinafter more fully described, illustrated in the accompanying drawings, and pointed out in the claim hereunto appended.

Figure 1:
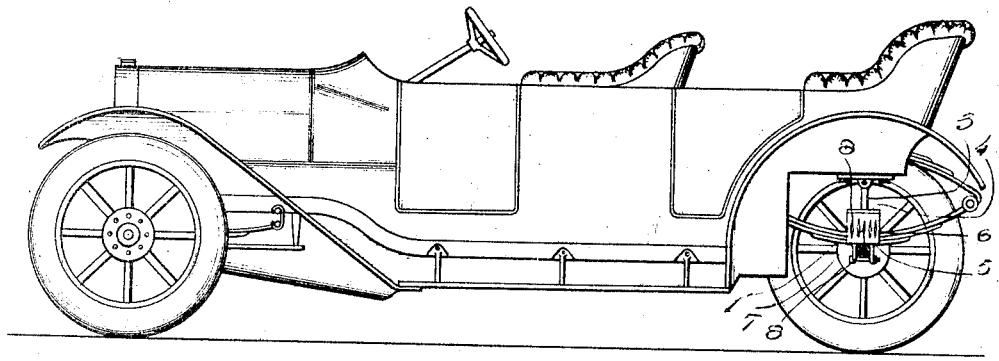
Figure 2:
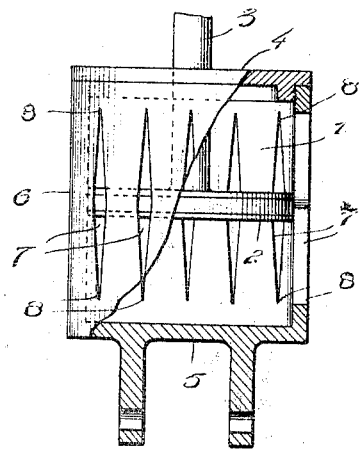
Figure 3:
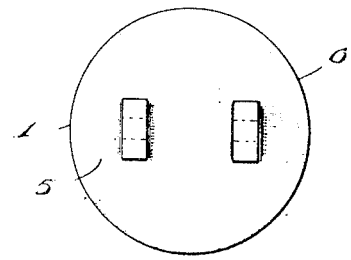

In the drawings: Figure 1 is a side elevation, showing the shock absorber applied to an automobile. Fig. 2 is a vertical diametrical section through the shock absorber on an enlarged scale. Fig. 3 is a bottom plan view of the cylinder.

The shock absorber contemplated in this invention comprises a cylinder 1, a piston 2, and a piston rod 3. The piston 2 is imperforate and is designed to fit closely to the inner peripheral wall of the cylinder, so as to prevent the air from passing around the peripheral edge of the piston. The rod 3 is connected rigidly to the piston and extends through the head 4 of the cylinder, the opposite head 5 being imperforate.

In carrying out the present invention, the peripheral wall 6 of the cylinder is provided with a circular series of elongated vents 7 in the form of slots which are substantially diamond-shaped. In other words, each of the slots is widest at its center, which corresponds approximately with the center of the cylinder between the heads 4 and 5 thereof, said slots tapering in both directions and terminating in acute angles 8, which are located a suitable distance from the adjacent heads 4 and 5, so that when the piston approaches close to either head of the cylinder, an air cushion will be established between the piston and such head of the cylinder, which will effectually check the further operation of the device.

It will be observed from the foregoing description, taken in connection with the accompanying drawings, that in its intermediate or central position, the piston has very little influence over the springs of the machine, which are thereby allowed to act with comparative freedom. However, as the piston approaches either the head 4 or the head 5 of the cylinder, the vent slots are gradually cut off or closed, and this gives a gradual check to the movement of the piston, and consequently to the springs of the vehicle, it being understood that the cylinder is connected to the body of the vehicle, while the piston rod is connected to one of the axles, or vice versa.

The construction above described does away with all adjustable resistance or check valves, the slots 7 performing the function of such valves and giving a gradual increase in the resistance to the movements of the piston back and forth in the cylinder.

What is claimed is:

A pneumatic shock absorber for vehicles comprising an air cylinder closed at both ends, an imperforate piston mounted to reciprocate therein, and a piston rod passing through one end of the cylinder, the cylinder having its circular wall perforated by an annular series of narrow diamond shaped vent slots open to the atmosphere, said slots being widest at the center and tapering therefrom toward the opposite ends of the cylinder and terminating at a distance from the ends of the cylinder.

In testimony whereof I affix my signature in presence of two witnesses.

GREENE E. NEWELL.

Witnesses:
S. H. JACKSON,
C. J. HARRIS.